US012723819B2

(12) United States Patent
Lipowski et al.

(10) Patent No.: US 12,723,819 B2
(45) Date of Patent: Sep. 1, 2026

(54) HEAT EXCHANGER FOR AIR COOLING

(71) Applicant: VALEO AUTOSYSTEMY SP. Z O.O., Skawina (PL)

(72) Inventors: Mateusz Lipowski, Skawina (PL); Damian Jurkiewicz, Skawina (PL); Kamil Bolek, Skawina (PL); Tomasz Plusa, Skawina (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 139 days.

(21) Appl. No.: 18/728,384

(22) PCT Filed: Dec. 13, 2022

(86) PCT No.: PCT/EP2022/085735
§ 371 (c)(1),
(2) Date: Jul. 11, 2024

(87) PCT Pub. No.: WO2023/134945
PCT Pub. Date: Jul. 20, 2023

(65) Prior Publication Data

US 2025/0093108 A1 Mar. 20, 2025

(30) Foreign Application Priority Data

Jan. 14, 2022 (EP) .................................... 22151648

(51) Int. Cl.
*F28D 7/16* (2006.01)
*F02B 29/04* (2006.01)
(Continued)

(52) U.S. Cl.
CPC ............ *F28D 7/16* (2013.01); *F02B 29/0462* (2013.01); *F28D 7/1684* (2013.01);
(Continued)

(58) Field of Classification Search
CPC ...... F02B 29/0462; F28D 7/16; F28D 7/1684; F28D 9/0006; F28D 9/0043;
(Continued)

(56) References Cited

U.S. PATENT DOCUMENTS 4,815,532 A * 3/1989 Sasaki .................. F28F 17/005 165/152
8,225,852 B2 * 7/2012 Wu ..................... F02B 29/0462 165/149
(Continued)

FOREIGN PATENT DOCUMENTS

CN 204663655 U * 9/2015
CN 206582023 U * 10/2017 ............ F28F 9/0256
(Continued)

OTHER PUBLICATIONS

International Search Report Issued in Corresponding PCT Application No. PCT/EP2022/085735, dated Apr. 12, 2023. (3 Pages).
(Continued)

*Primary Examiner* — Ljiljana V. Ciric
(74) *Attorney, Agent, or Firm* — Osha Bergman Watanabe & Burton LLP

(57) ABSTRACT

A heat exchanger configured to cool air flow with a coolant liquid includes a heat exchanger core and a first and second air flow duct. The air flow ducts are located at a first and second end of the heat exchanger core, respectively. The heat exchanger core includes air flow channels that define liquid passes between the air flow channels. The heat exchanger core includes plates enveloping the air flow channels and the liquid passes. At least one of the plates includes a first projection defining a liquid chamber at a first longitudinal end of the heat exchanger core and a second projection defining a corridor connected to the liquid chamber. The corridor extends from the liquid chamber int eh
(Continued)

direction of the second longitudinal end of the heat exchanger core.

10 Claims, 4 Drawing Sheets

(51) Int. Cl.

| | |
|---|---|
| ***F28D 9/00*** | (2006.01) |
| ***F28D 21/00*** | (2006.01) |
| ***F28F 1/40*** | (2006.01) |
| ***F28F 3/02*** | (2006.01) |
| ***F28F 3/12*** | (2006.01) |

(52) U.S. Cl.
CPC ......... *F28D 9/0006* (2013.01); *F28D 9/0043* (2013.01); *F28F 1/40* (2013.01); *F28F 3/025* (2013.01); *F28F 3/12* (2013.01); *F28D 2021/0082* (2013.01)

(58) Field of Classification Search
CPC ..... F28D 2021/0082; F28F 1/40; F28F 3/025; F28F 3/12
See application file for complete search history.

(56) References Cited

U.S. PATENT DOCUMENTS

| | | | | |
|---|---|---|---|---|
| 9,343,755 | B2 * | 5/2016 | Vanderwees | H01M 8/04141 |
| 9,920,686 | B2 * | 3/2018 | Somhorst | F02B 29/0412 |
| 11,280,559 | B2 * | 3/2022 | Onkarachari | F28D 21/0003 |
| 11,525,638 | B2 * | 12/2022 | Vanderwees | F28F 3/025 |
| 11,740,028 | B2 * | 8/2023 | Vanderwees | F28D 9/0075 165/167 |
| 2006/0118284 | A1 * | 6/2006 | Tauren | F28F 9/22 165/157 |
| 2006/0201663 | A1 * | 9/2006 | Strahle | F28D 9/0031 165/157 |
| 2018/0149433 | A1 * | 5/2018 | Peskos | F28D 9/0056 |
| 2025/0093108 | A1 * | 3/2025 | Lipowski | F28D 7/1684 |

FOREIGN PATENT DOCUMENTS

| | | | | | |
|---|---|---|---|---|---|
| CN | 107076532 | B | * | 6/2019 | F02G 5/02 |
| CN | 111536814 | A | * | 8/2020 | F28F 9/02 |
| DE | 102014213718 | A1 | | 1/2016 | |
| DE | 112018001666 | T5 | | 1/2020 | |
| EP | 1886086 | B1 | * | 12/2016 | F28D 9/0043 |
| EP | 3246647 | A1 | | 11/2017 | |
| EP | 3388773 | A1 | | 10/2018 | |
| FR | 2855604 | A1 | * | 12/2004 | F28D 9/0043 |
| KR | 102271010 | B1 | * | 6/2021 | F28F 9/0219 |
| WO | WO-2021185987 | A1 | * | 9/2021 | F28F 9/182 |

OTHER PUBLICATIONS

Written Opinion of the International Searching Authority Issued in Corresponding PCT Application No. PCT/EP2022/085735, dated Apr. 12, 2023. (4 Pages).

* cited by examiner

HEAT EXCHANGER FOR AIR COOLING

The invention relates to heat exchangers and more particularly to heat exchangers designed to cool an air flow using a coolant liquid.

These heat exchangers may be used in vehicles in order to cool inlet gases of a turbo-charged internal combustion engine with a coolant liquid, for instance a water-based coolant liquid.

Such heat exchangers usually comprise a casing inside which there are channels dedicated to the circulation of the gases as well as passes for the coolant liquid to circulate inside the heat exchanger. The channels and the passes are arranged so that the gases and the coolant liquid can exchange calories, resulting in a drop of temperature for the gases.

More specifically, the channels can extend from one end of the heat exchanger bearing an air inlet to another end bearing an air outlet, the air circulating inside the heat exchanger from the air inlet to the air outlet. The channels are usually stacked horizontally, i.e. one next to the other in a direction perpendicular to that of the air flow. The liquid coolant can circulate in passes located in between the channels, from a liquid inlet to a liquid outlet. Due to this disposition of the liquid inlet and outlet relative to that of the passes, there can however be a risk of local boiling in the vicinity of the liquid outlet for the passes which are the farthest from the centre of the heat exchanger. These passes are indeed at risk of not being cooled enough by the coolant liquid. As such, there is a need for heat exchangers inside of which the coolant liquid flow is improved.

The present invention fits into this context by providing a heat exchanger with at least one corridor for the coolant liquid facing the passes located at a distance from the centre of the heat exchanger, thus improving the flow of the coolant liquid and avoiding local boiling in these passes.

In this context, the present invention is directed to a heat exchanger configured to cool an air flow with a coolant liquid, comprising a heat exchanger core, a first air flow duct located at a first longitudinal end of said heat exchanger core and a second air flow duct located at a second longitudinal end of said heat exchanger core, the heat exchanger core comprising a plurality of air flow channels defining liquid passes in between at least two air flow channels, said heat exchanger core comprising a plurality of plates enveloping the air flow channels and the liquid passes. According to the invention, at least one of the plates has at least a first projection defining a liquid chamber at the first longitudinal end of the heat exchanger core and at least a second projection defining a corridor connected to the liquid chamber and configured for the circulation of the coolant liquid, the corridor extending from the liquid chamber and in the direction of the second longitudinal end of the heat exchanger core.

The heat exchanger according to the invention requires a coolant liquid in order to cool the air. This air flows in the heat exchanger, and more precisely in its heat exchanger core, from the first air duct or air inlet located at its first longitudinal end, to the second air duct or air outlet located at its second longitudinal end which is opposed to the first longitudinal end.

The plurality of plates of the heat exchanger core, for instance four plates, define an internal housing for the air and the coolant liquid to circulate inside the heat exchanger core. More precisely, when circulating inside the heat exchanger core the air is contained in air flow channels whereas the coolant liquid can circulate in the spaces between these air flow channels, which form liquid passes. Two of the plates are used to delimitate the liquid passes vertically, by closing a volume inside of which the coolant liquid can circulate. One of these two plates bears the first projection defining the liquid chamber and the second projection defining the corridor, wherein the coolant liquid can circulate as well. In other words, the liquid chamber and the corridor are in liquid communication with the liquid passes. The projections of the plate making up the liquid chamber and the corridor extend opposite of the internal housing. The liquid may be a water-based coolant liquid, e.g., a mix of water and glycol, which is designed to exchange calories with the air flowing inside the air flow channels. Each air flow channel is furthermore equipped with an air flow disrupter, which helps distribute the air within the heat exchanger core.

The presence of the corridor and its disposition help improve the distribution of the coolant liquid within the heat exchanger core. In some embodiments, the corridor faces at least one of the liquid passes.

As an option of the invention, the corridor defined by the second projection is a first corridor, the plate having the first and second projections also having a at least third projection defining a at least second corridor connected to the liquid chamber and configured for the circulation of the coolant liquid.

There are thus at least two corridors extending from the liquid chamber and in the direction of the second longitudinal end of the heat exchanger core.

According to an optional characteristic of the invention, each of the at least two corridors faces one of the liquid passes.

According to an optional characteristic of the invention, the heat exchanger core comprises a group of central liquid passes and two lateral liquid passes bordering said group of central liquid passes, the first corridor facing one of the lateral liquid passes and the second corridor facing the other lateral liquid pass.

Each of the first corridor and second corridor extends alongside a transverse end of the plate having the liquid chamber. Such arrangement helps improve the coolant liquid flow in the lateral liquid passes, thus preventing local boiling in these lateral liquid passes.

According to another optional characteristic of the invention, the first corridor and the second corridor are parallel.

As such, they extend along straight lines which are also parallel to the air flow channels.

In some embodiments, the first corridor and the second corridor have the same dimension measured in a direction perpendicular to a longitudinal direction of the heat exchanger core.

This dimension corresponds to the width of the first corridor and the second corridor. The corridors having the same width helps ensure that the coolant liquid flows similarly on each side of the heat exchanger core.

According to an optional characteristic, the heat exchanger core comprises at least a coolant inlet and a coolant outlet, the first projection defining the liquid chamber bearing one of them.

The coolant liquid enters the heat exchanger core via the coolant inlet and exits it via the coolant outlet. Either the coolant inlet or the coolant outlet is located on the projection. In other words, either the coolant inlet is located on the liquid chamber or the coolant outlet is located on the liquid chamber.

In some embodiments, the liquid chamber defined by the first projection is a first liquid chamber, the plate having the first and second projections also having a fourth projection defining a second liquid chamber, such second liquid chamber being located at the second longitudinal end of the heat exchanger core, at least one of the corridors joining the first liquid chamber and the second liquid chamber.

There is then a first liquid chamber located at the first longitudinal end of the heat exchanger core and a second liquid chamber located at the second longitudinal end of the heat exchanger core, these first and second chambers being joined by the corridors.

According to another optional characteristic, the second liquid chamber is blind.

This means that the walls of the second liquid chamber do not have a hole in them, and more specifically that the second liquid chamber does not bear an inlet or an outlet.

According to another optional characteristic of the invention, the coolant inlet and the coolant outlet are located on opposite plates of the heat exchanger core.

Such arrangement of the coolant inlet and outlet ensures a satisfactory flow of coolant in the heat exchanger core, so that all the air flow channels are adequately cooled.

According to another optional characteristic of the invention, the coolant outlet is located closer to the first longitudinal end of the heat exchanger core whereas the coolant inlet is located closer to the second longitudinal end of the heat exchanger core.

Likewise, this arrangement of the coolant inlet and of the coolant outlet contributes to a satisfactory distribution of coolant liquid in the heat exchanger core.

Other characteristics, details and advantages of the invention will become clearer on reading the following description, on the one hand, and several examples of realisation given as an indication and without limitation with reference to the schematic drawings annexed, on the other hand, on which:

The characteristics, variants and different modes of realisation of the invention may be associated with each other in various combinations, in so far as they are not incompatible or exclusive with each other. In particular, variants of the invention comprising only a selection of features subsequently described in from the other features described may be imagined, if this selection of features is enough to confer a technical advantage and/or to differentiate the invention from prior art.

Like numbers refer to like elements throughout drawings.

In the following description, the designations "longitudinal", "transversal" and "vertical" refer to the orientation of the heat exchanger according to the invention. A longitudinal direction corresponds to a direction in which the air flow channels of the heat exchanger mainly extend, this longitudinal direction being parallel to a longitudinal axis L of a coordinate system L, V, T shown in the figures. A transversal direction corresponds to a direction in which the liquid passes slot in between the air flow channels, this transversal direction being parallel to a transverse axis T of the coordinate system L, V, T, and perpendicular to the longitudinal axis L. Finally, a vertical direction corresponds to a vertical axis V of the coordinate system L, V, T, the vertical axis V being perpendicular to the longitudinal axis L and the transversal axis T.

Figure 1:
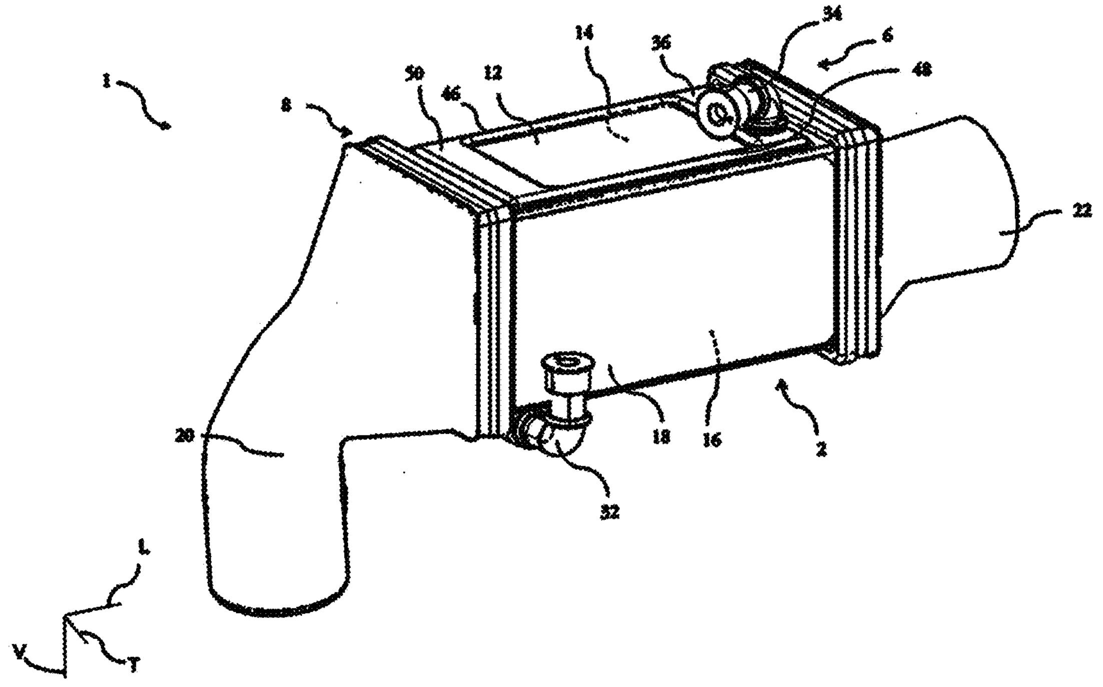
FIG. 1 is a perspective view of a heat exchanger according to the invention.
Figure 2:
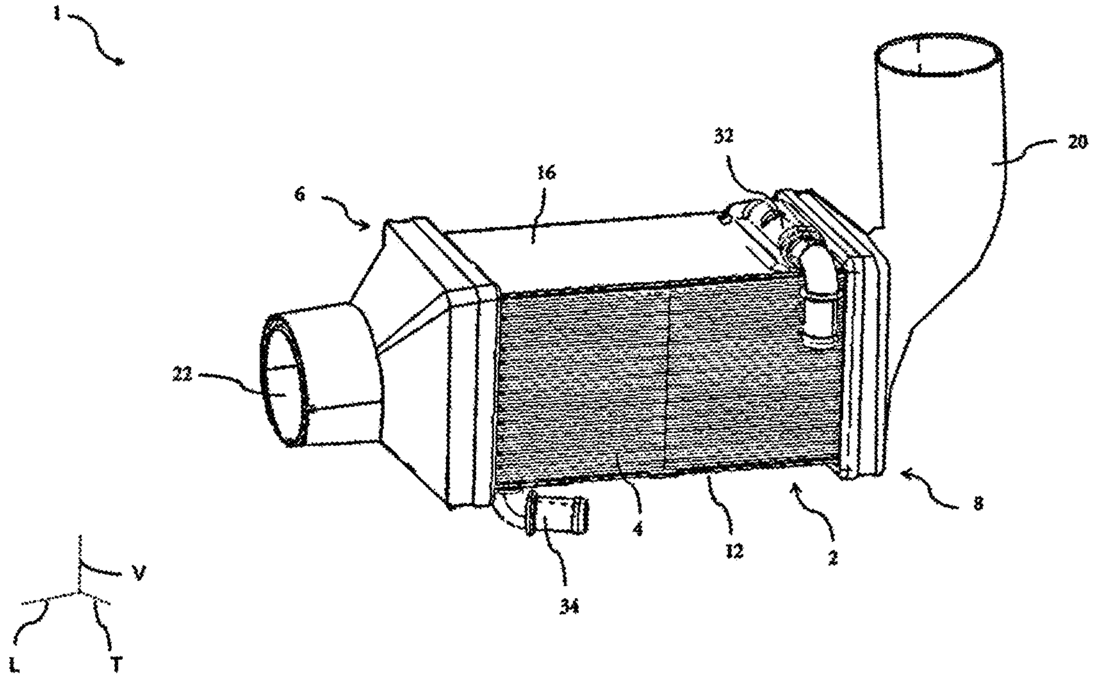
FIG. 2 is another perspective view of the heat exchanger of FIG. 1 with one of its plates having been removed, the heat exchanger being shown upside down compared to FIG. 1.

FIG. 1 and FIG. 2 are perspective views of a heat exchanger 1 according to the invention, such heat exchanger 1 being destined to cool an air flow. The heat exchanger 1 can for example be installed in a vehicle such as an automobile vehicle in order to cool its inlet gases.

Figure 3:
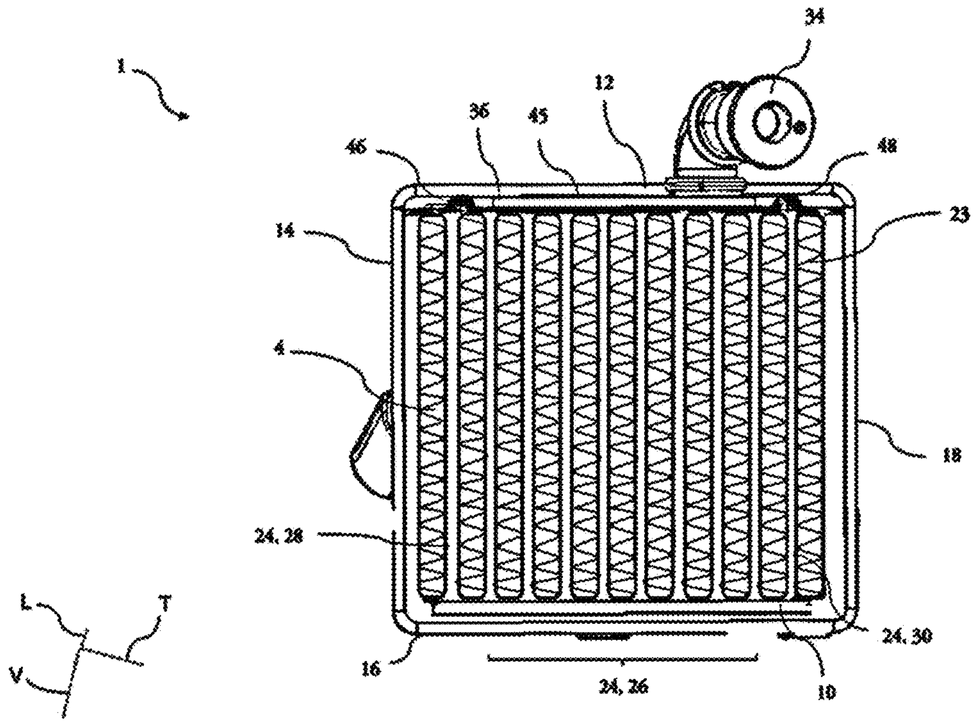
FIG. 3 is a cross-section of the heat exchanger of FIG. 1.

The heat exchanger 1 comprises a heat exchanger core 2, which makes up its central portion. The heat exchanger core 2 is furthermore the part of the heat exchanger 1 where calorie exchanges occur, these calorie exchanges being essential to the cooling of the air flow. To this end, the heat exchanger core 2 comprises air flow channels 4 within which the air needing to be cooled can circulate. Such air flow channels are particularly visible on FIG. 2, as well as on FIG. 3 which is a cross-section view. These air flow channels 4 extend from one side of the heat exchanger core 2 to the other according to a longitudinal direction, more particularly from a first longitudinal end 6 of the heat exchanger core to its second longitudinal end 8. The air flow channels 4 are contained in an internal housing 10 of the heat exchanger core 2, which is made of plates such as aluminium plates. As represented here, the heat exchanger core 2 comprises four rectangular plates, among which a first plate 12, a second plate 14, a third plate 16 and a fourth plate 18. The first plate 12 and the third plate 16 face each other and extend mainly according to a longitudinal-transversal plane, whereas the second plate 14 and the fourth plate 18 face each other and extend mainly according to a longitudinal-vertical plane.

The air flow thus circulates in the internal housing 10 and more precisely in the air flow channels 4 from the second longitudinal end 8 to its first longitudinal end 6. More specifically, the air flow may enter the heat exchanger 1 via an air inlet 20 located at the second longitudinal end 8 and may exit it via an air outlet 22 located at the first longitudinal end 6 of the heat exchanger core 2. Both the air inlet 20 and the air outlet 22 are air flow ducts, and they may for instance be made of polyvinyl chloride.

Each air flow channel 4 is equipped with an air flow disrupter 23, which helps distribute the air flow more homogeneously within the heat exchanger core 2. These air flow disrupters are particularly visible on FIG. 3. They snake inside their respective air flow channels 4 from one of their lateral ends in the vicinity of the first plate 12 to an opposite lateral end of the air flow channels 4 close to the third plate 16, forming winglets in the air flow channels 4 so as to deviate the air flowing inside them.

The air flow channels 4 are stacked one next to the other according to a transverse direction, perpendicular to the longitudinal direction. The spaces between two contiguous air flow channels 4 define liquid passes 24, within which a coolant liquid may circulate. This coolant liquid can be water-based; it can for instance be a mix of 50% water and 50% glycol. In addition to the liquid passes 24, the coolant liquid may also circulate in the spaces between the air flow channels 4 and the first plate 12 on the one hand and between these air flow channels 4 and the third plate 16. Among the liquid passes 24, the heat exchanger core 2 comprises a group of central liquid passes 26 as well as two lateral liquid passes 28, 30 bordering said group of central liquid passes 26, among which a first lateral liquid pass 28 and a second lateral liquid pass 30. The first lateral liquid pass 28 faces the second plate 14 whereas the second lateral liquid pass 30 faces the fourth plate 18, although there may be an air flow channel 4 in between each of these first and second lateral liquid passes 28, 30 and the plate 14, 18 they respectively face. In any case, every air flow channel 4 and every liquid pass 24 is contained within the internal housing 10 of the heat exchanger core 2 of the heat exchanger 1. In other words, this internal housing 10 participates in delimiting a volume for both the air flow and the coolant liquid to circulate inside of.

The heat exchanger 1 according to the invention is configured to receive the coolant liquid via a coolant inlet 32 and to evacuate the coolant liquid via a coolant outlet 34. Similarly to the air inlet 20 and the air outlet 22, the coolant inlet 32 and the coolant outlet 34 are ducts and can be made of polyvinyl chloride. As shown on FIGS. 1 and 2, the coolant inlet 32 and the coolant outlet 34 may be located on opposite plates of the heat exchanger core 2, with here the coolant outlet 34 located on the first plate 12 and the coolant inlet 32 located on the third plate 16. This ensures the coolant liquid can flow through the heat exchanger core 2 from the first plate 12 to the third plate 16, which means from one of its lateral end to the other, and cool the air flowing in the air flow channels 4 adequately. To this end, the coolant outlet 34 may in addition be located in the vicinity of the first longitudinal end 6 of the heat exchanger core 2 while the coolant inlet 32 is closer to its second longitudinal end 8, thus reinforcing the spreading of the coolant liquid within the heat exchanger core 2.

The first, second, third and fourth plates 12, 14, 16, 18 making up the heat exchanger core 2 are mostly plane. However, according to the invention at least one of these plates, here the first plate 12, has a first projection in addition to its plane portion. Such first projection is located at the first longitudinal end 6 of the heat exchanger core 2 and it defines a liquid chamber 36 which is in liquid communication with the liquid passes 24, so that the coolant liquid can circulate through it. This liquid chamber 36 is particularly visible on FIGS. 4 to 7. The height H of the first projection, which corresponds to its dimension measured according to the vertical direction, can for example be of the order of 3.5 mm, as shown on FIG. 6. The liquid chamber is made of four sides 38, 40, 42, 44 extending from the first plate 12 and opposite to the internal housing 10. These four sides 38, 40, 42, 44 are joined by a back wall 45, which is pierced with a hole 47 to which either the coolant inlet 32 or the coolant outlet 34 can be connected. The back wall 45 is mainly parallel to the plane portion of the first plate 12.

Out of these four sides, two delimit the liquid chamber 36 according to the transverse direction, namely a first lateral side 38 and a second lateral side 40. These lateral sides 38, 40 extend along the longitudinal direction, that is to say mainly parallel to the air flow channels 4 and to the liquid passes 24. The liquid chamber 36 is furthermore delimited according to the longitudinal direction by two longitudinal sides, with a first longitudinal side 42 and a second longitudinal side 44. These longitudinal sides 42, 44 extend along the transverse direction, and as such are mainly perpendicular to the air flow channels 4 and the liquid passes 24.

In addition to the first projection, the first plate 12 also has a second projection defining a corridor 46 which is connected to the liquid chamber 36 and is configured for the circulation of the coolant liquid. This corridor 46 extends from the liquid chamber 36 and in the direction of the second longitudinal end 8 of the heat exchanger core 2. More precisely, the corridor 46 is an extension of either the first lateral side 38 or the second lateral side 40.

In some embodiments and as illustrated on the figures, the heat exchanger core 2 can comprise two corridors. In this case, the corridor 46 defined by the second projection is a first corridor 46 and the first plate 12 has a third projection defining a second corridor 48. Both the second projection and the third projection extend opposite of the internal housing 10. When there are two corridors 46, 48, the first corridor 46 may be an extension of the first lateral side 38 of the liquid chamber 36 while the second corridor 48 is an extension of the second lateral side 40. It is thus understood that the first and second corridors 46, 48 are parallel and extend according to the longitudinal direction, each in the vicinity of one of the transverse ends of the first plate 12.

As such, the first corridor 46 faces the first lateral liquid pass 28 whereas the second corridor 48 faces the second lateral liquid pass 30. The presence of the corridors 46, 48 and their disposition help improve coolant liquid flow in the lateral liquid passes 28, 30, thus preventing local boiling in these lateral liquid passes 28, 30.

As mentioned before, the first corridor 46 and the second corridor 48 extend in the direction of the second longitudinal end 8 of the heat exchanger core 2. In some embodiments, the corridors 46, 48 may extend up to this second longitudinal end 8, whereas in other embodiments they do not extend all the way to of the second longitudinal end 8; in other words, the length L of the corridors 46, 48, which is their dimension measured according to the longitudinal direction, may be reduced. The lengths L of the first corridor 46 and second corridor 48 have an impact on the cooling of the lateral liquid passes 24; the longer they are, the better the lateral liquid passes 24 will avoid local boiling.

Figure 4:
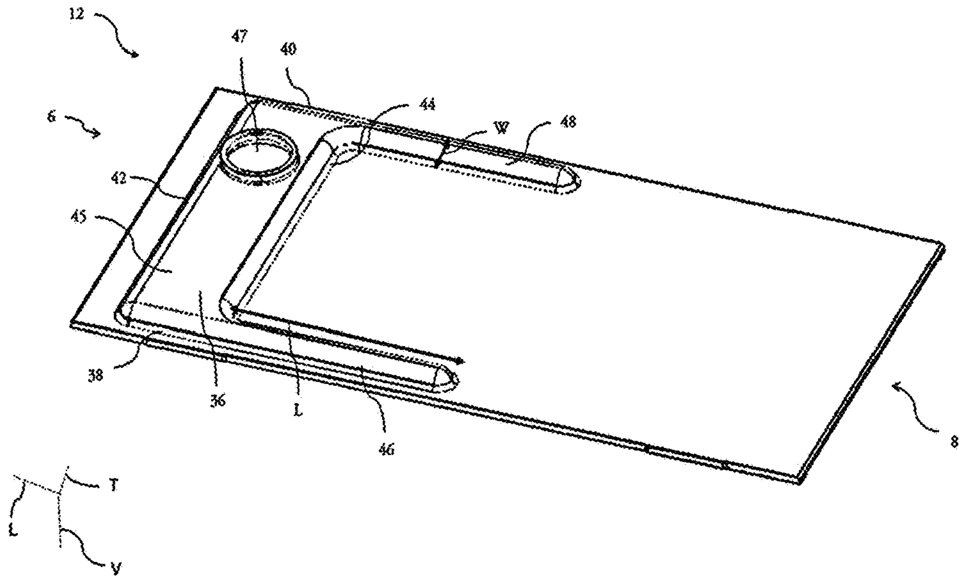
FIG. 4 is a schematic representation of one of the plates of the heat exchanger, according to a particular embodiment.
Figure 5:
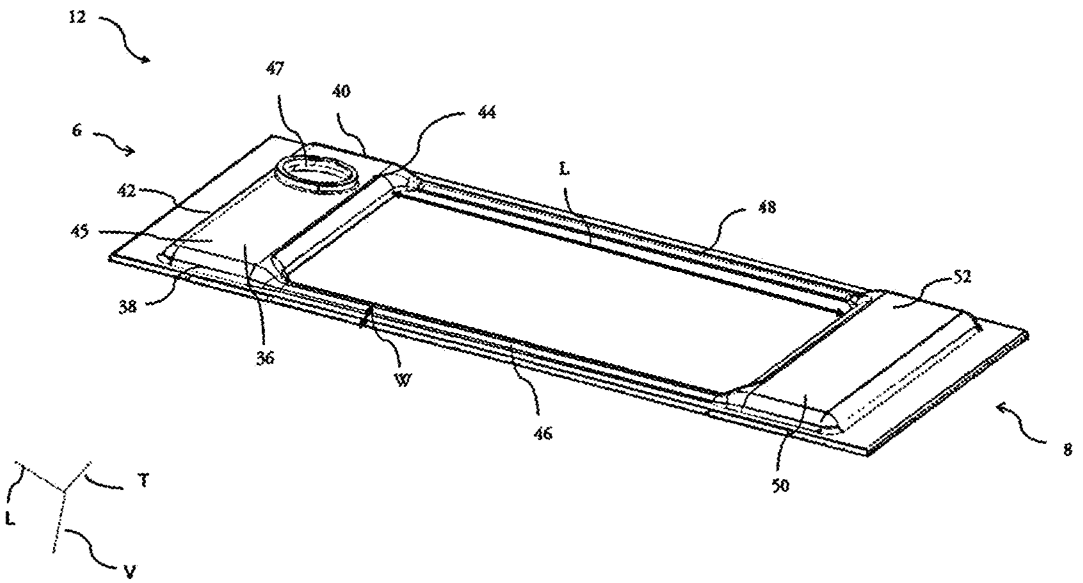
FIG. 5 is a schematic representation of the plate of FIG. 4, according to another particular embodiment.
Figure 6:
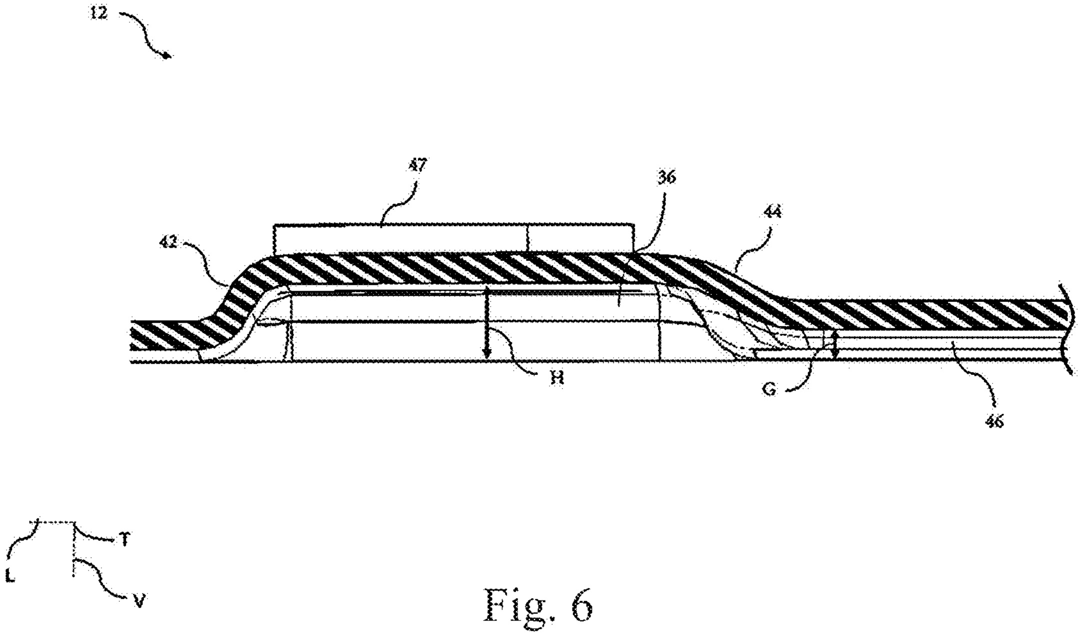
FIG. 6 is a cross-section of the plate of FIG. 5.
Figure 7:
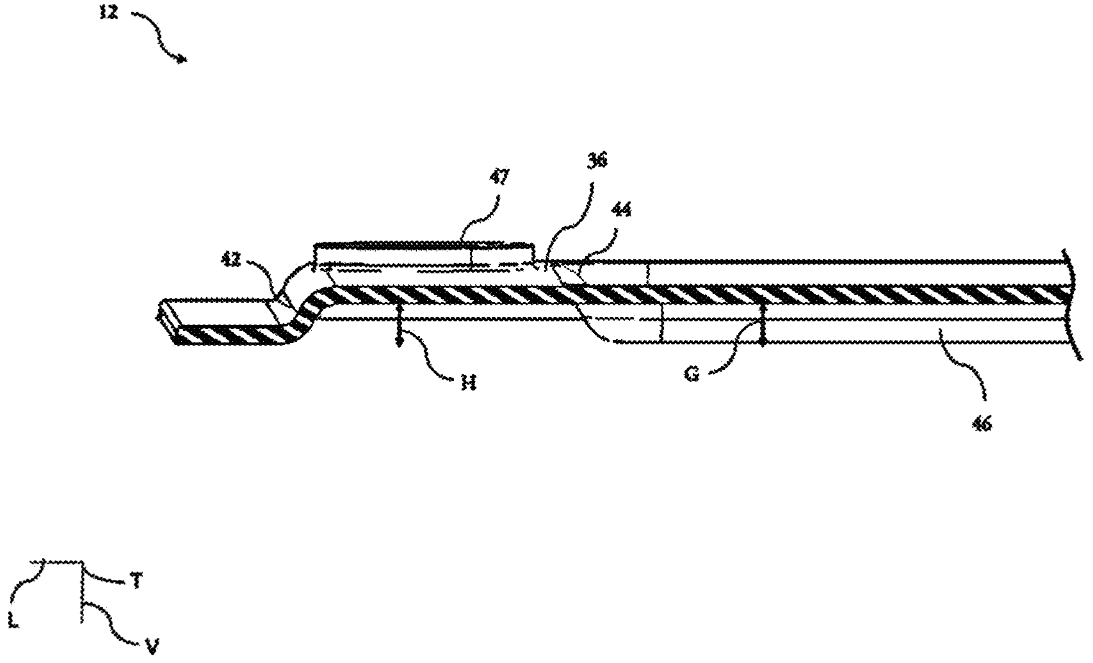
FIG. 7 is a cross-section of a variant of the plate of FIG. 5.

FIG. 4 illustrates a first plate 12 with reduced corridor lengths L. The first corridor 46 and second corridor 48 extend from the liquid chamber 36 and in the direction of the second longitudinal end 8 of the heat exchanger core 2, up to about half of the first plate 12 according to the longitudinal direction. Conversely, the embodiments represented on FIGS. 1 and 5 show the first and second corridors 46, 48 extending further according to this longitudinal direction, that is to say that on these figures the corridors 46, 48 have a greater length L. As an example, these first and second corridors 46, 48 can here have a length L of about 115 mm.

More particularly, on FIGS. 1 and 5 the first corridor 46 and the second corridor 48 extend up to a second liquid chamber 50. This second liquid chamber 50 is defined by a fourth projection of the first plate 12. While the liquid chamber 36 defined by the first projection, or first liquid chamber 36, is located at the first longitudinal end 6 of the heat exchanger core 2, this second liquid chamber 50 is located at the second longitudinal end 8 of the heat exchanger core 2. First liquid chamber 36 and second liquid chamber 50 are joined by the first corridor 46 and the second corridor 48.

In some embodiments, and as is the case on FIGS. 1 and 5, this second liquid chamber 50 may be blind. This means that a back wall 52 of the second liquid chamber 50, extending mainly parallel to the plane portion of the first plate 12 and similar to the back wall 45 of the first liquid chamber, is not pierced with a hole. It is thus understood that this second liquid chamber 50 is not configured to bear either a coolant inlet or a coolant outlet.

The first corridor 46 and the second corridor 48 may have the same dimension measured according to the transverse direction of the heat exchanger 1. This dimension corresponds to a width W of the first corridor 46 and the second corridor 48. The corridors 46, 48 having the same width helps ensure that the coolant liquid flows similarly on each side of the heat exchanger core 2. As an example, the width W of the corridors 46, 48 can be of about 10 mm.

In addition to the length L and the width W of the first and second corridors 46, 48, another factor influencing the flow of the coolant liquid within the heat exchanger core 2 is the height G of these corridors 46, 48, which will now be described in reference to FIGS. 4 to 7. Such height G of the corridors 46, 48 corresponds to their dimension measured according to the vertical direction. In some embodiments, the height G of the first corridor 46 and of the second corridor 48 can be the same as the height H of the liquid chamber 36. In other words, there is no increase or decrease between a section of the liquid chamber 36 and a section of either corridor 46, 48. Such embodiments are particularly visible on FIGS. 4 and 7, where the height G of the corridors 46, 48 can be of about 3.5 mm. On the contrary, in other embodiments and as illustrated on FIGS. 5 and 6, the first plate 12 exhibits different sections for the liquid chamber 36 on the one hand and for the corridors 46, 48 on the other hand. More precisely, the height G of the first corridor 46 and the second corridor 48 is reduced compared to that of the liquid chamber 36. The height G of the corridors 46, 48 can for instance be equal to half the height H of the liquid chamber 36, or to a quarter of this height H. Such reduction in height compared to the liquid chamber 36 allows to control even better the flow of the coolant liquid within the heat exchanger core 2.

The present invention thus covers a heat exchanger within which the flow of the coolant liquid, thus allowing an adequate cooling everywhere in the heat exchanger and more particularly in its lateral liquid passes.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A heat exchanger configured to cool an air flow with a coolant liquid, the heat exchanger comprising:
a heat exchanger core,
a first air flow duct located at a first longitudinal end of the heat exchanger core, and
a second air flow duct located at a second longitudinal end of the heat exchanger core,
the heat exchanger core comprising a plurality of air flow channels defining liquid passes in between at least two air flow channels,
the heat exchanger core comprising a plurality of plates enveloping the air flow channels and the liquid passes,
wherein at least one of the plates comprises at least a first projection defining a liquid chamber at the first longitudinal end of the heat exchanger core and at least a second projection defining a corridor connected to the liquid chamber and configured for the circulation of the coolant liquid,
wherein the corridor extends from the liquid chamber and in the direction of the second longitudinal end of the heat exchanger core.

2. The heat exchanger according to claim 1,
wherein the corridor defined by the second projection is a first corridor,
wherein the plate with the first and second projections also comprises a third projection defining a second corridor connected to the liquid chamber and configured for the circulation of the coolant liquid.

3. The heat exchanger according to claim 2,
wherein the heat exchanger core comprises:
a group of central liquid passes, and
two lateral liquid passes bordering the group of central liquid passes,
wherein the first corridor faces one of the lateral liquid passes, and
wherein the second corridor faces the other lateral liquid pass.

4. The heat exchanger according to claim 2,
wherein the first corridor and the second corridor are parallel.

5. The heat exchanger according to claim 2,
wherein the first corridor and the second corridor have the same dimension measured in a direction perpendicular to a longitudinal direction of the heat exchanger core.

6. The heat exchanger according to claim 1,
wherein the heat exchanger core comprises at least a coolant inlet and a coolant outlet,
wherein the first projection defines the liquid chamber bearing the coolant inlet or outlet.

7. The heat exchanger according to claim 6,
wherein the liquid chamber defined by the first projection is a first liquid chamber,
wherein the plate with the first and second projections further comprises a fourth projection defining a second liquid chamber,
wherein the second liquid chamber is located at the second longitudinal end of the heat exchanger core,
wherein at least one of the corridors joins the first liquid chamber and the second liquid chamber.

8. The heat exchanger according to claim 7,
wherein the second liquid chamber is blind.

9. The heat exchanger according to claim 7,
wherein the coolant outlet is located closer to the first longitudinal end of the heat exchanger core whereas the coolant inlet is located closer to the second longitudinal end of the heat exchanger core.

10. The heat exchanger according to claim 6,
wherein the coolant inlet and the coolant outlet are located on opposite plates of the heat exchanger core.

* * * * *